UNITED STATES PATENT OFFICE.

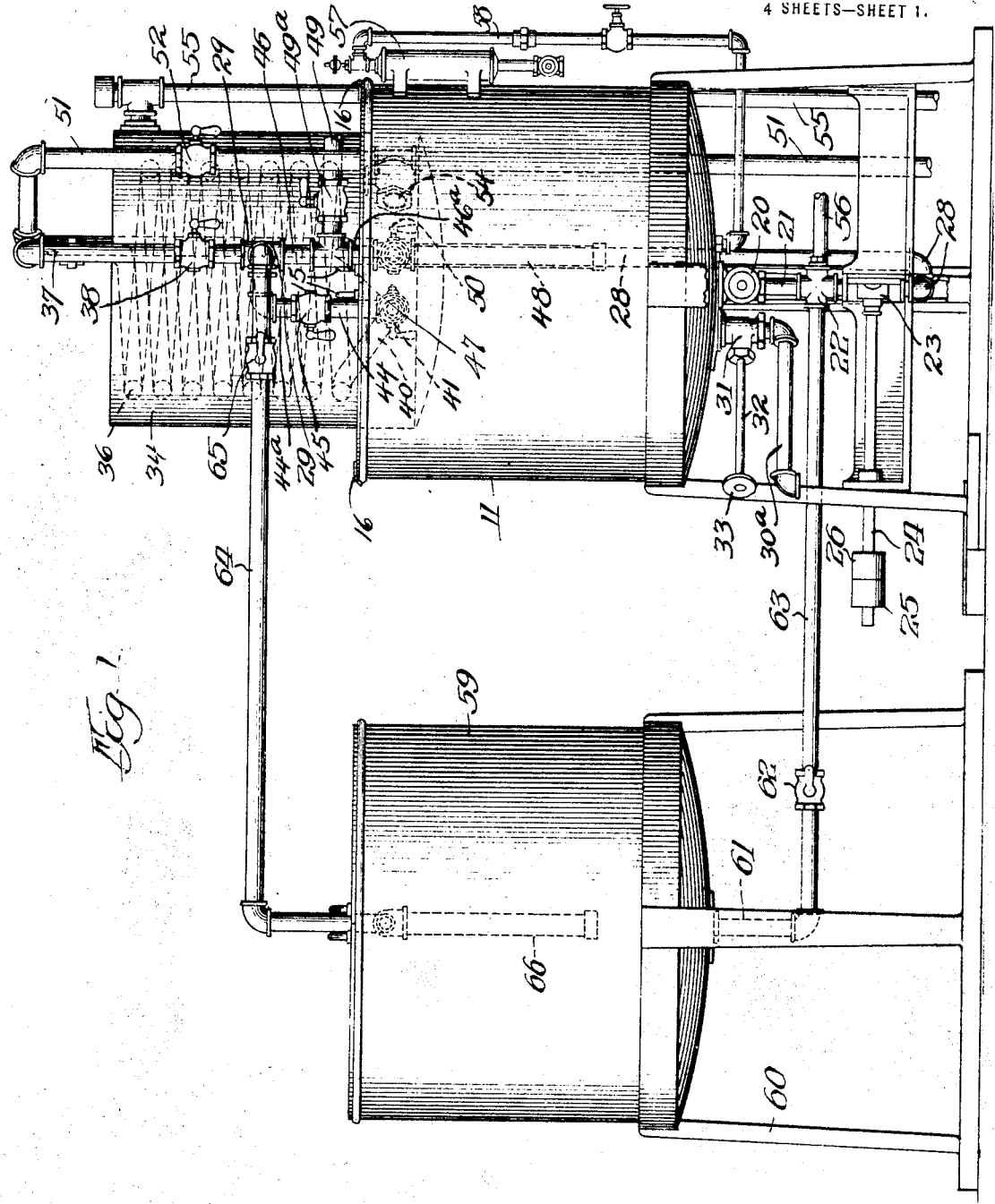

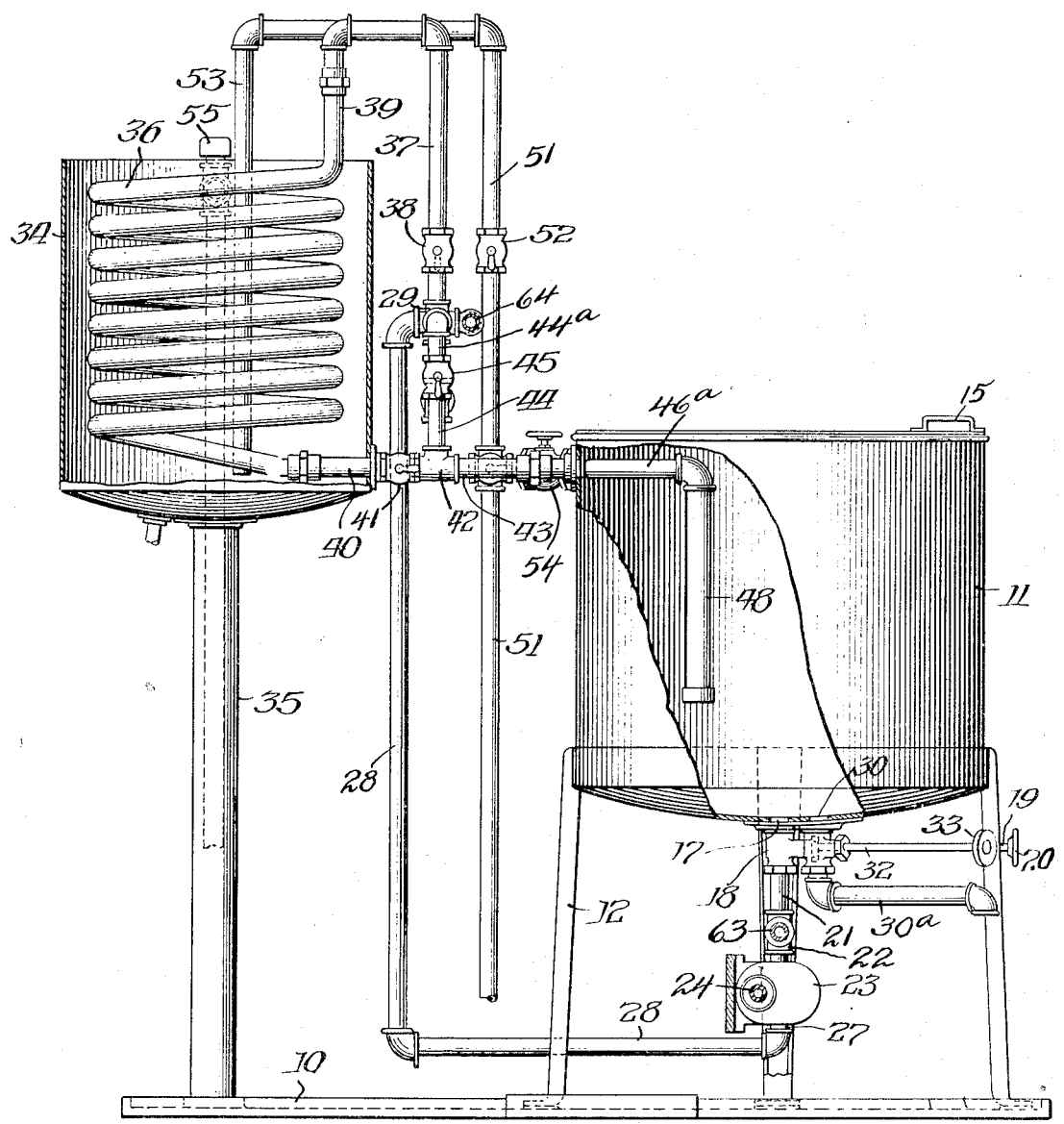

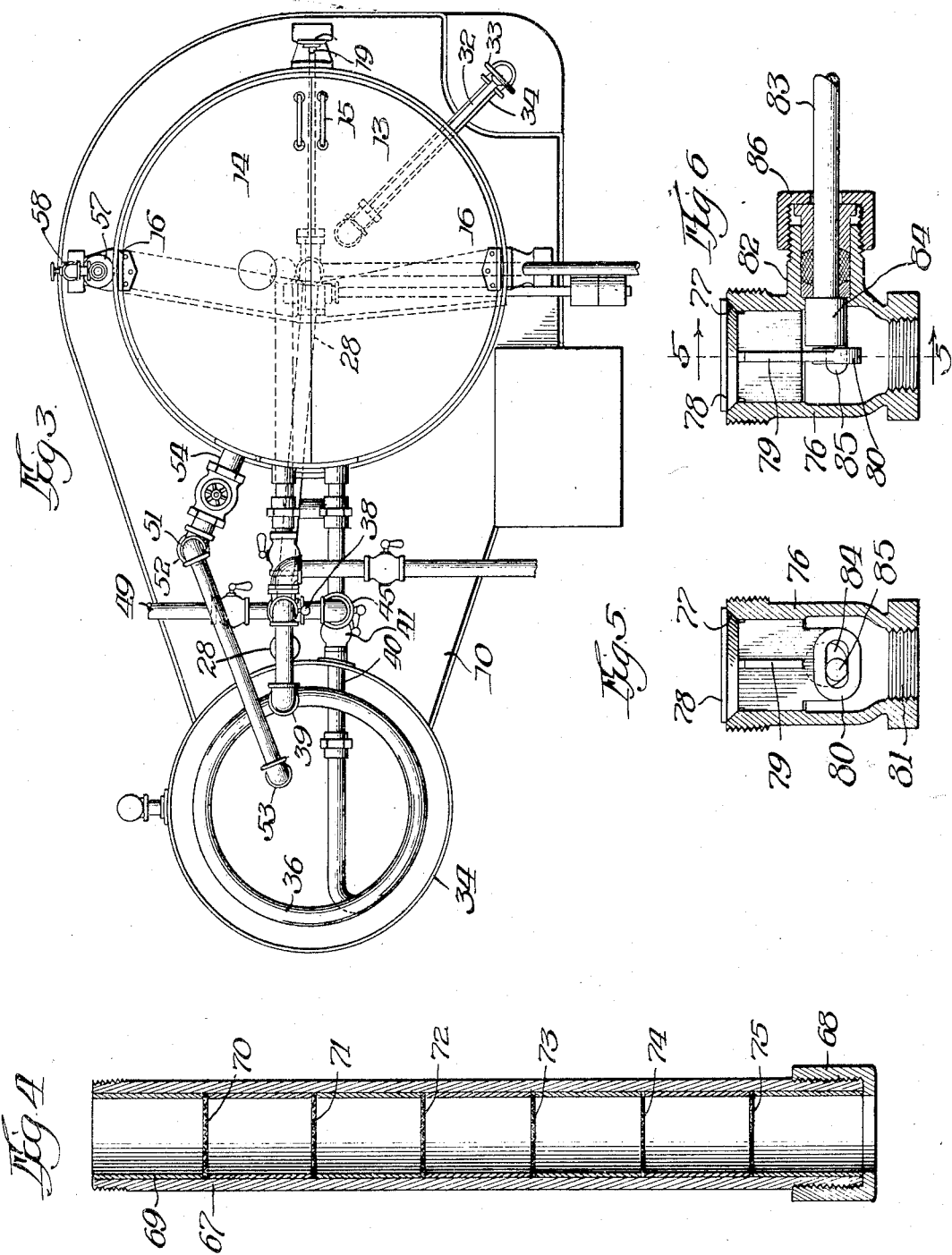

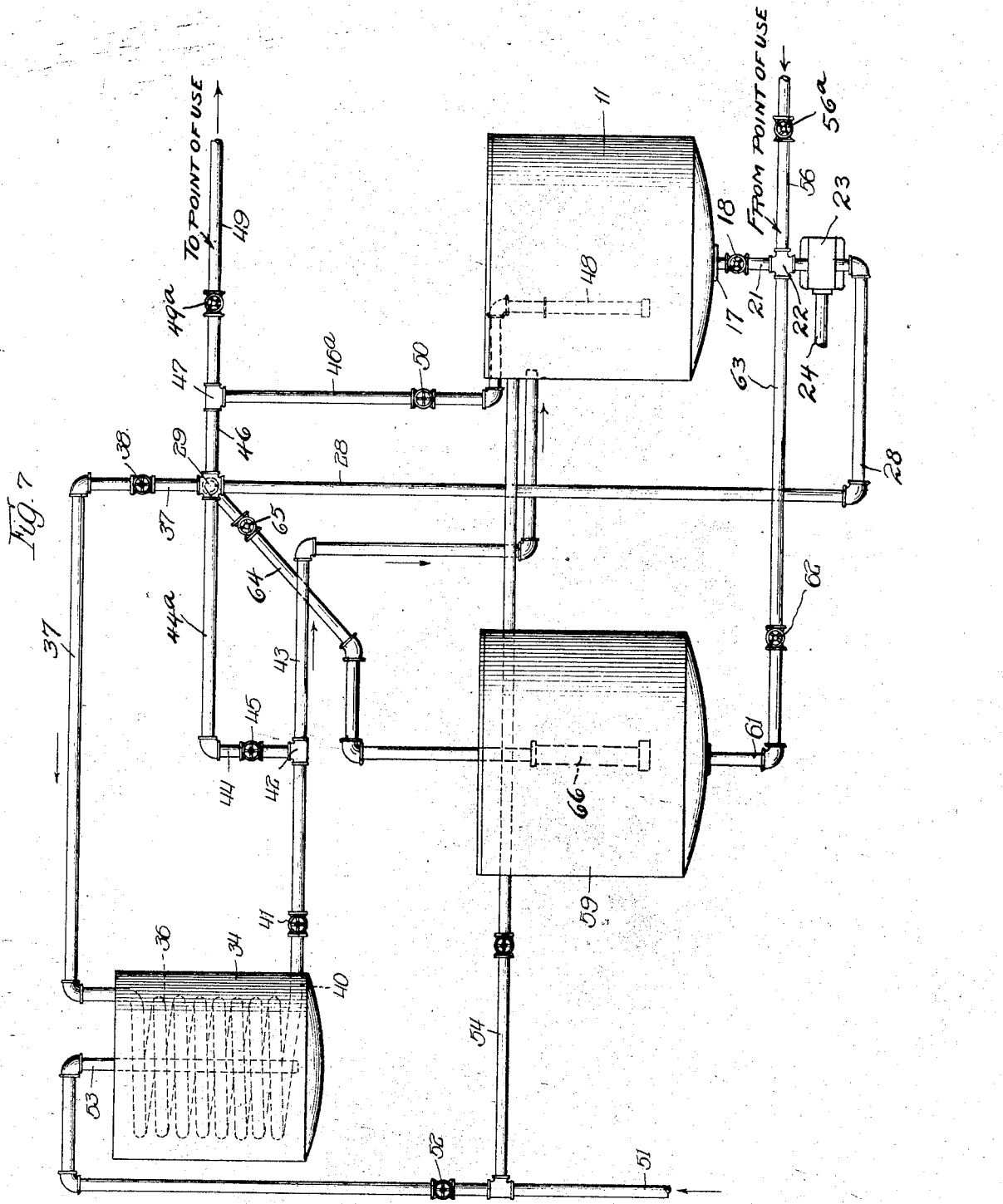

FRANK E. RANKIN, OF CAMBRIDGE, MASSACHUSETTS, ASSIGNOR TO TROY LAUNDRY MACHINERY COMPANY, LTD., OF CHICAGO, ILLINOIS, A CORPORATION OF NEW YORK.

METHOD OF AND APPARATUS FOR PROCESSING STARCH.

1,411,934.     Specification of Letters Patent.     Patented Apr. 4, 1922.

Application filed December 17, 1917. Serial No. 207,445.

*To all whom it may concern:*

Be it known that I, FRANK E. RANKIN, a citizen of the United States, residing at Cambridge, in the county of Middlesex and State of Massachusetts, have invented certain new and useful Improvements in Methods of and Apparatus for Processing Starch, of which the following is a specification.

My invention relates to starch process machines and particularly to a novel method and apparatus for practicing the method comprising an arrangement of tanks and connections whereby the method of processing starch for use in ironing and starching machines may be conveniently performed, and it may be possible to keep a laundry of any size supplied with a sufficient quantity of starch of the desired consistency.

An object of my invention is to provide a process and apparatus for preparing a starch emulsion for laundry purposes.

Another object of my invention is to improve starch processing machines in general.

A further object is to provide a machine which will reduce the manual labor in connection with starching processing.

A still further object is to arrange various tanks and connections so that the cooked starch may be cooled preparatory to adding uncooked starch thereto without having to add cold water directly thereto.

A yet further object is to arrange the various parts and connections so as to perform the several steps in any desired order.

Other objects will be apparent from the drawings and specification wherein are disclosed a practical and convenient embodiment of my improved machine for practicing my novel process.

Figure 1 is a front elevation of the preferred embodiment of my invention, showing a cooker, a cooler and a container.

Figure 2 is a side elevation of the cooker and cooler looking from the left in Figure 1.

Figure 3 is a top plan view of Figure 2.

Figure 4 is a vertical section of the strainer.

Figures 5 and 6 are vertical sectional views of a novel valve which I employ.

Figure 7 is a schematic drawing showing pipe connections between the various members of the mechanism of my invention.

In the drawings, I provide a base 10 preferably of cast iron, on which I mount the cooker and the cooler. If desired the base may be sufficiently large to have also secured thereto a container and other parts. 11 is the cooker which, in the embodiment shown, consists of a tank supported by legs 12, which legs are secured to the base 10. The tank is covered by two hinged cover members 13 and 14 (see Fig. 3) provided with handles 15 and hinged to the edges of the tank at 16, each of the covers covering substantially half of the tank. The bottom of the tank is depressed and is provided with an outlet 17 with which is connected a valve 18. The operation of the valve is controlled by an outstanding spindle 19 having the handle 20. Extending downwardly from the valve 18 to a cross connection 22 is a pipe 21. Supported on the frame-work of the tank is a pump 23 connected to the pipe 21 through connection 22 and having a driving shaft 24 carrying at its outer end tight and loose pulleys 25 and 26. If desired the shaft 24 may be connected to an electric motor or other desirable power means. Leading downwardly from the pump 23 is a pipe 27 from which a main or circulation pipe 28 leads to the T 29 (see Fig. 2). The bottom of the tank 11 is provided with another outlet 30 which is controlled by a valve 31, similar in construction to valve 18 and actuated by the stem 32 and handle 33. Connected to the valve 31 is a drain pipe 30$^a$, the purpose of which will be explained later.

Also mounted on the base 10 is the cooler or cooling tank, comprising a shell 34 supported by a standard or other suitable means 35. The shell 34 is mounted so that its bottom will be substantially even with the top of the tank 11 the purpose of which will be explained hereinafter. For the purpose of draining and cleaning the bottom of the cooler, the bottom of the shell 34 is depressed the same as the bottom of the tank 11 is depressed. Mounted within the shell 34 is a pipe coil 36 positioned so that water may circulate freely thereabout. Extending upwardly from T 29 is a pipe 37 having a valve 38 therein, which pipe is connected to the upper portion 39 of the coil 36. Connected to the lower end of the coil 36 is an outlet pipe 40 controlled by a valve 41 and leading to a T 42, from which one branch 43 extends to the tank 11 for discharge therein and the other branch to an upwardly extending connection 44 controlled by valve 45, from which valve a connection 44ª is made with the T 29, (see Figs. 1 and 2). Extending downwardly from T 29, is a connection 46 terminating in a T 47. From one branch of the T 47 a connection 46ª is made with the upper portion of the tank 11 which connection is extended into the tank and provided with a downwardly directed end portion 48, which contains the strainer. Projecting from the other branch of the T 47 is a pipe 49 for connection to a source of use, such as a starching machine. Pipe 49 is provided with a controlling valve 49ª. In the connection from the T 47 to the strainer 48 there is a valve 50. For filling the cooler with water there is provided an upstanding pipe 51 having a valve 52 therein and provided with a portion 53 extending downwardly within the shell 34, terminating short of the bottom thereof. The other end of the pipe 51 is adapted for connection to any suitable water supply. Near the top of the tank 11 as shown in Figure 3 there is a valve controlled connection 54 with the water supply pipe 51 for the purpose of cleaning out the tank 11 when so desired. Suitably attached to the shell 34 is an overflow 55. This is of any desired kind. Connected into the cross connections 22 in the pipe 21 adjacent the bottom of the tank 11 is a pipe 56, controlled by a valve 56ª, which pipe may be connected to a source of use, such as a starching machine, to bring back to the cooker the starch not used in such machine. In Figure 1 there is shown a condenser 57 connected to the lower portion of the tank 11 by valve controlled pipe 58. This condenser serves the well known purpose of drying the steam supplied to the starch in the tank 11 and need not be described in detail nor in method of operation.

In Figure 1 there is shown a storage container which comprises a tank 59 suitably supported on legs or like structures 60, the height of the tank 59 being substantially the same as that of the cooker 11. Connected into the lower portion of the tank 59 is a pipe 61 having therein a valve 62 and connected by pipe 63 with the cross connections 22 underneath the cooker 11. Extending from T 29 is a pipe 64 having therein a valve 65 and which pipe is directed into the top of the container 59. If desired a strainer 66 may be connected to the end of the pipe 64.

By operation of the proper valves various functions may be performed by the machine of my invention. First the cooking operation, which consists in heating starch with a sufficient quantity of water so as to make the mass sufficiently fluid to be pumped. During the cooking it is desirable to agitate the mass within the cooker 11 which can be done by discharging the mass within the lower end of the tank by means of the pump and taking it back into the top of the tank through pipes and connections which will be more fully explained hereinafter. Then after the cooking has proceeded to a predetermined point the mass in the cooker may be cooled by pumping the contents of the cooker to the cooling apertures a sufficient number of times to reduce it to any desired temperature. When this temperature is reached, raw starch is then put into the mass in the cooker, the mass is then agitated as before, then the whole mass is cooled and subsequently led back through the strainer whereby the starch is strained and is then ready for use. By proper arrangement of the pipe connections the finished starch may be led over into the container and there kept until the required time or it may be sent directly to the starching machine, or if desired, retained in the cooker.

Referring to some of the details of construction, attention is directed to Figures 4, 5 and 6. Figure 4 is a vertical sectional view of the preferred type of the strainer which I have found very satisfactory in connection with the container. The strainer comprises a casing 67 threaded to each end for connection at one end with the pipe from the cooler and at the other having a cap provided with a central aperture. Mounted within the casing 67 are a series of sleeves 69, retaining between the ends of adjacent sleeves screens or strainers 70, 71, 72, 73, 74 and 75, the mesh of the screens increasing in fineness from 70 to 75, so that the fluid finally discharged through the last or finest screen 75 is of the proper consistency for use in starching laundered articles. When it is desired to clean the strainer, which occasion arises frequently, it is necessary only to unscrew the casing 67 from its connection with the intake pipe and turn the casing up side down which will permit the sleeves 69 to fall out and with them the various screens, all of which may be cleaned by water, air or other fluid being directed therethrough from the under side.

Figures 5 and 6 show a valve which I have found excellent for use with a fluid of the consistency of starch, the valve comprising a casing 76 threaded at the upper end to engage the threaded outlet of the tank and provided at its upper edge with annular shoulders 77, with which valve 78 contacts. If desired, the valve 78 may be ground to fit the seat 77. On the under side of the valve 78 is a stem 79 terminating in an elongated loop portion 80. The lower end of the casing is provided with a threaded outlet 81 connected with a suitable pipe. Extended from one side of the casing 76 is a portion 82 which forms a stuffing box for the spindles 83 to the valve handle. The inner end of the handle is provided with a circular head portion 84 carrying a lug 85 which extends within the elongated aperture of the member 80, the circular portion 84 being carried by suitable bearing in the side of the casing. Proper packing is inserted around the spindle 83 and the projection 82 is closed by a cap 86. Such a valve arrangement is a quick opening and closing one and does not clog or become inoperative by virtue of the stiffening of the starch when allowed to stand.

The various operations will now be described in detail. First, the cooking operation. The proper amount of starch and water is put into the cooker 11 and steam then injected therein for the purpose of heating the mass. The pump 23 is started, the valve 18 is opened and the valve 38 closed, also valves 50, 49ª and 41 are closed, and valve 45 opened. Consequently, the cooking mass is pumped from the tank to the pipe 28 into the connection 29, downwardly through the connection 44ª, valve 45, connection 44, T-coupling 42, connection 43 and back into the tank 11. This circulation is continued until the mass is cooked to a sufficient point, when it is desirable then to cool the mass for the introduction of the raw starch. Instead of introducing cold water into the interior of tank 11 directly onto the cooking mass, the latter mass is pumped through the cooler which is made possible by the opening of valve 38 and closing of valve 45. The mass is then led upwardly through pipe 28, connection 29, pipe 37, downwardly through the cooling coil 36 and when the valve 41 is opened, back through pipe 43 into the tank 11. This is continued until the temperature of the mass within the tank 11 is in the neighborhood of 115°. When this temperature is reached the circulation to the cooler is stopped, and then the circulation from the cooker 11 is directed through the strainer 48 instead of directly into the tank through the pipe 43. The circulation through the strainer 48 is accomplished by closing the valves 38, 45, 41 and 49ª, and opening the valve 50, when the circulation will be from the pipe 28 to connection 29, pipes 46 and 46ª and valve 50 to the strainer 48. Then the raw starch is added to the mass in the cooker, and if desired, a sufficient amount of water. The whole mass is then carried through the previously described operation, i. e. from the pipe 28 through pipe 44ª, valve 45, pipe 44, coupling 42 and pipe 43 back into the cooker 11 until it is sufficiently mixed, and subsequently the mass is led through the strainer. By straining the fluid it is reduced to a sufficient state so that it may be used in starching machines.

It has been learned that if cold water is added to starch that has just been cooked, the whole mass will become lumpy and if the cooked starch is cooled to the temperature of the water that is to be added with the raw starch, it will mix much more readily and require a shorter length of time in getting a much smoother emulsion than would be obtained otherwise. The finished starch made in accordance with the above described process is creamy and smooth and very readily utilized in the starching machines.

In laundries using a great amount of starch, it is often times necessary to make more than one batch so that no time will be lost when the first batch is used. Furthermore, it is desirable to not have to make a new batch of starch every morning, consequently, by the employment of the storage container it is possible to make a batch of starch in the cooker in accordance with the method above described and then pump it into the container to be used as desired. The starch is conducted from the cooker 11 to the container 59 through the pipe 28, connection 29, pipe 64, valve 65 and into the top of the tank 59. Then a new batch may be made in the cooker for supplying the container when the contents thereof is exhausted At night time, at the close of business there often times remains starch in the starching machines. Heretofore, it has been necessary for some attendant to remove the starch and empty it manually into the cooker or the tank or throw it away. By provision of the pipe 56 having the valve 56ª I have been able to reclaim this starch conducting it back into the cooker or container, as hereinafter explained, and using it the following day by first mixing it with a suitable quantity of fresh starch. In the morning on starting to use the starch the cooker may be operated a sufficient length of time to heat the contents of the cooker and container so as not to delay the operation and the thus heated starch in the container may be used immediately while more is being made.

In short, in the original preparation of a batch of starch, the raw starch is placed in the cooker 11 and cooked by the application of heat in any suitable manner. Instead of employing mechanical agitating means, effective agitation of the cooking mass may be accomplished by circulating the same through the valve 18, the pipe 28, connection 29 pipe 44ª, valve 45, pipe 44, coupling 42 and pipe 43 back into the top of the cooker. If this agitation does not render the batch smooth enough for laundry purposes, the mass may be strained or emulsified by circulating the same from the connection 29 through the pipe 46, connection 47, pipe 46ª, valve 50 and then through the strainer 48 into the cooker. The prepared mass may be pumped to a point of use from the connection 29 through the pipe 46, connection 47, valve 49ª and pipe 49. Any starch left in a starching machine, at the end of a day's work, may be returned to the cooker by closing the valve 18 at the bottom of the cooker, and opening the valve 56ª, whereupon the starch in the starching machine will be drawn through the pipe 56, pump 23, pipe 28, connection 29, and then through the strainer 48 or through the pipe 43 back to the cooker 11 by manipulation of certain of the valves as hereinbefore described. Cooked starch in the cooker may be transferred to the container or storage tank 59 by pumping the mass from the cooker, through the pipe 28, to the connection 29 and thence through the pipe 64 and valve 65 into the container. Also starch remaining in a starching machine may be returned to the container through the pipe 56, connection 22, pump 23, pipe 28, the connection 29 and pipe 64. From the storage tank or container 59 starch may be supplied to a point of use through the pipe 61, valve 62, connection 22, pump 23, pipe 28, connection 29 and pipes 46 and 49. Furthermore starch within the container 59 may be returned to the cooker by passing it as just described to the connection 29, from which it may be passed either to the emulsifier 48 or through the pipe 43 back into the cooker.

It will here be explained that the pipe 28 is the main or circulation pipe leading to the distributor 29. The pipe 46 leading from the distributor 29 together with the pipe 49 constitute a service pipe leading to a point of use. The pipes 46 and 46ª constitute a return pipe leading from the distributor 29 to an upper portion of the cooker 11. Another return from the distributor 29 to the cooker 11 is constituted by the pipes 44ª, 44 and 43. A still further return includes the pipe 37, the coil 36 and the pipe 43.

As hereinbefore described it is important that the cooked mass in the cooker 11 be cooled without the direct addition of water into the tank 11, preparatory to adding raw starch to the cooked starch in the cooker, and this is accomplished by circulating the mass, from the cooker, through the pipe 28 to the connection 29, the connection 37, the coil 36 and the pipe 43 back to the cooker.

From the foregoing description it will be understood that by the use of a single pump, the mass which has been cooked in the cooker 11 may be conducted through the pipe system to several different points for several different purposes, and in this connection it will be noted that the part 29 is an important feature of the invention in that the starch is first conducted from the cooker to the part 29 from which it may be distributed in four different directions, i. e. through any one of the pipes 37, 44ª, 64 and 46. The cooking mass may be effectually agitated by withdrawing the mass from the bottom of the cooker and returning it into the top thereof selectively through the pipe 43 and the strainer 48, thereby avoiding the use of a mechanical agitator. The cooking mass may be effectually reduced in temperature as an important step preliminary to the addition of raw starch for the purpose of preventing lumping thereof. The cooked starch may be stored in the storage tank 59. Starch may be conducted selectively from the cooker and the storage tank to a point of use, and unused starch may be returned selectively to the cooker and the container. Each and every one of the several different operations or circulations may be effected merely by the operation of valves to change the direction of flow of the material, the single pump maintaining the circulation at all times.

By mounting the cooler so that the flow therethrough will be by gravity, I have been able to overcome the objections heretofore found where it has been attempted to pump the starchy fluid through the cooler, it being well known that the starchy fluid solidifies quickly clogging the pipes, and consequently requiring a pump of much greater capacity than I find is necessary if the pipes are arranged as hereinbefore described.

It will be observed that I have provided water connections for cleaning the various parts of my mechanism so that when the machine is to be cleaned the contents having been withdrawn, proper amount of water may be directed to the cooker 11, cooler 34 and the container 59, and if desired, pumped through the various pipes and connections, thus cleaning them thoroughly.

I have been able to make with the machine of my invention starch which is of a consistency much better than has heretofore been able to be made. By the various combinations of piping and connections I have been able to provide a substantially automatic system of processing starch, doing away with the use of manual labor to a great extent. In fact the only manual labor necessary is that of putting the starch into the cooker 11, all the other steps being performed by machinery.

I am aware that modifications of such a device may be made and such modifications as come within the scope of the appended claims I consider as within the spirit of my invention.

I claim:

1. In a starch processing apparatus, a cooker, a cooler, a storage container, a circulation pipe leading from the cooker, pipes leading from the circulation pipe to the cooler and from the cooler to the cooker, a pipe leading from the main pipe to the storage container, a service pipe leading from the main pipe, a pump for obtaining circulation through the pipes, and a system of valves for the pipes to control direct circulation between the cooker and cooler, between cooker and container, selectively from the cooker and container through the service pipe to a point of use, and from said point of use selectively to the container and cooker.

2. In a starch processing apparatus, a cooker, a circulation pipe leading from a bottom portion of the cooker to a top portion thereof, a pump for obtaining circulation through the apparatus, a service pipe leading from the circulation pipe to a point of use, and valves for the pipes to selectively control circulation through the circulation pipe from the bottom to the top of the cooker and from the circulation pipe through the service pipe.

3. In a starch processing apparatus, a cooker, a circulation pipe leading from a bottom portion of the cooker and including a distributor, a return pipe leading from the distributor to a top portion of the cooker, a service pipe leading from the distributor to a point of use, a pump for obtaining circulation through the apparatus, and valves for the pipes for selectively controlling circulation through the return pipe and through the service pipe.

4. In a starch processing apparatus, a cooker, a main circulation pipe leading from a bottom portion of the cooker, a service pipe leading from the main pipe to a point of use, a branch pipe leading from the main pipe to an upper portion of the cooker, another branch pipe leading from the main pipe to the cooker and provided with a strainer within the cooker, a pump to obtain circulation through the pipes, and a system of valves operable to direct the circulation selectively through one of the branch pipes back to the cooker, through the other branch pipe to the strainer, and from the main pipe through the service pipe leading to a point of use.

5. In a starch processing apparatus, a cooker, a main pipe leading from a bottom portion of the cooker, a branch pipe leading from the main pipe to an upper portion of the cooker, a cooler connected to the main pipe and through the branch pipe to the cooker, a service pipe leading from the main pipe to a point of use, a pump to obtain circulation through the pipes, and a system of valves to control the flow from the bottom portion of the cooker to the upper portion thereof, from the cooker to the cooler and back to the cooker, and from the cooker through the main pipe to the service pipe leading to a point of use.

6. In a starch processing apparatus, a cooker, a main pipe leading from a bottom portion thereof, a branch pipe leading from the main pipe to an upper portion of the cooker, another branch pipe leading from the main pipe to the cooker and provided with a strainer within the cooker, a service pipe leading to a point of use, a cooler connected to the main pipe and through the first branch pipe to the cooker, a pump for obtaining circulation through the pipes, and a system of valves in the pipes for directing circulation from the main pipe through the branch pipe to the cooker, from the main pipe through the other branch pipe to the strainer, from the main pipe to the cooler and back to the cooker, and from the main pipe through the service pipe to the point of use.

7. In a starch processing apparatus, a cooker, a cooler, a main pipe leading from the cooker and provided with a distributor connection, a branch pipe leading from the distributor to an upper portion of the cooker, another branch pipe leading from the distributor to the cooker and provided with a strainer within the cooker, another branch pipe leading to the cooler, a pipe leading from the cooler to the first mentioned branch pipe to connect the cooler with the cooker, a service pipe leading from the second branch pipe to a point of use, said pipes constituting a pipe system, a pump to obtain circulation through the pipe system, and a system of valves in the pipes, said valves being operable to obtain circulation from the distributor through the first mentioned branch pipe to the cooker, from the distributor to the cooker through the strainer, from the distributor through the cooler to the first mentioned branch pipe and back to the cooker, and from the distributor through the service pipe leading to a point of use.

8. In a starch processing apparatus, a cooker, a main pipe leading therefrom, a branch pipe leading from the main pipe to an upper portion of the cooker, a storage container, another branch pipe leading from the main pipe to the container, a service pipe leading from the main pipe to a point of use, said pipes constituting a pipe system, a pump for obtaining circulation through the pipe system, a pipe leading from the container to the pump, and a system of valves for the pipe system, said valves being operable to control circulation from the cooker through the main pipe and through the first mentioned branch pipe to the cooker, from the main pipe through the other branch pipe to the container, from the container through the pump and the main pipe and the first mentioned branch pipe to the cooker, and from the main pipe through the service pipe to the point of use.

9. In a starch processing apparatus, a cooker, a storage container, a cooler, and a pipe system connecting said members and including a main pipe leading from the bottom of the cooker and provided with a distributor, a branch pipe leading from the distributor to an upper portion of the cooker, another branch pipe leading from the distributor to an upper portion of the cooker and provided with a strainer within the cooker, a pipe leading from the distributor to the cooler, a pipe leading from the cooler to the first mentioned branch pipe, a pipe leading from the distributor to the container, a service pipe leading from the second branch pipe to a point of use, a pump to obtain circulation through the pipe system, a pipe leading from the bottom portion of the container to the pump, and a system of valves for the pipe system, said valve system selectively controlling circulation from the cooker through the service distributor, from the distributor through the first mentioned branch pipe to the cooker, from the distributor through the cooler back to the cooker through the first mentioned branch pipe, from the distributor to the container, from the distributor to the pipe leading to a point of use, and from the container to the distributor.

10. In a starch processing apparatus, a cooker, a storage container, a cooler, and a pipe system connecting said members and including a main pipe leading from the bottom of the cooker and provided with a distributor, a branch pipe leading from the distributor to an upper portion of the cooker, another branch pipe leading from the distributor to an upper portion of the cooker and provided with a strainer within the cooker, a pipe leading from the distributor to the cooler, a pipe leading from the cooler to the first mentioned branch pipe, a pipe leading from the distributor to the container, a service pipe leading from the second mentioned branch pipe to a point of use, a pump to obtain circulation through the pipe system, a pipe leading from the bottom portion of the container to the pump, a pipe leading from a point of use to the pump, and a system of valves for the pipe system, said valves selectively controlling circulation from the cooker to the distributor, from the distributor through the first mentioned branch pipe to the cooker, from the distributor through the cooler back to the cooker through the first mentioned branch pipe, from the distributor to the container, from the distributor through the service pipe leading to a point of use, from the container to the distributor and also selectively from the point of use back to the cooker and the container.

11. In a starch processing apparatus, a cooker, a storage container, means to transfer from the cooker to the container and vice versa, means to selectively transfer from the cooker and container to a point of use, and means to selectively return from the point of use to the cooker and container.

12. In a starch processing apparatus, a cooker, a storage container, a cooler, means to transfer from the cooker to the cooler and back to the cooker, means to transfer from the cooker to container and vice versa, and means for selectively transferring from the cooker and container to a point of use.

13. In a starch processing apparatus, a cooker, a storage container, a cooler, means to transfer from the cooker to the cooler and back to the cooker, means to transfer from the cooker to container and vice versa, means for selectively transferring from the cooker and container to a point of use, and means for selectively returning from the point of use to the cooker and container.

14. In a starch processing apparatus, a cooker, a storage container, a pipe system connecting the cooker and container with a point of use and also connecting the cooker and container, means for creating circulation in the system, and valves for directing the circulation from cooker to container and vice versa, and also selectively from container and cooker to a point of use.

15. The herein described method of processing starch which consists in cooking starch in a cooker, causing cooked starch to flow from a bottom portion of the mass into a top portion thereof to agitate the same, conducting starch from the cooker to a cooler and returning the same to the cooker, then leading starch from a bottom portion of the mass to a top portion thereof, and straining the starch while being led the second time from a bottom portion of the mass to a top portion thereof.

16. In a starch processing apparatus, a cooker, a cooler located at a higher elevation than the cooker, a pipe connecting a lower portion of the cooker with an upper portion of the cooler, another pipe connecting a lower portion of the cooler with an upper portion of the cooker, and a pump included in the pipe leading from the lower portion of the cooker to the cooler, a service pipe leading from the first mentioned pipe to a point of use, and valves in the pipes for selectively controlling the flow from the cooker to the cooler and through the service pipe.

17. In a starch processing apparatus, the combination of a cooker, a cooler located at a higher elevation than the cooker and including a water cooled coil, a main pipe leading from the cooker to an upper portion of the coil of the cooler, a return pipe leading from the bottom of the cooling coil to an upper portion of the cooker, a service pipe leading from the main pipe to a point of use, a pump included in the main pipe for obtaining circulation through the apparatus, and valves in the pipes for selectively controlling circulation from the cooker to the cooler and through the service pipe to a point of use.

Signed at Chicago, State of Illinois, this 15th day of December, A. D., 1917.

FRANK E. RANKIN.